United States Patent [19]

Howell

[11] 4,283,499

[45] Aug. 11, 1981

[54] RESINS

[75] Inventor: Thomas J. Howell, Langhorne, Pa.

[73] Assignee: Rohm and Haas Company, Philadelphia, Pa.

[21] Appl. No.: 130,923

[22] Filed: Mar. 17, 1980

Related U.S. Application Data

[63] Continuation of Ser. No. 951,102, Oct. 13, 1978, abandoned, which is a continuation of Ser. No. 809,957, Jun. 27, 1977, abandoned.

[51] Int. Cl.$^3$ ............................................ C08F 212/36
[52] U.S. Cl. ...................................... 521/38; 526/227; 526/232; 526/232.3
[58] Field of Search ............... 521/38; 526/227, 230.5, 526/232, 232.3

[56] References Cited

U.S. PATENT DOCUMENTS

| | | | |
|---|---|---|---|
| 3,449,311 | 6/1969 | Lowell | 526/230 |
| 3,627,708 | 12/1971 | Morse | 260/2.2 R |
| 3,817,878 | 6/1974 | Clemens | 260/2.1 E |
| 3,976,629 | 8/1976 | Hayward | 526/227 |
| 3,991,017 | 11/1976 | Barrett | 260/2.1 R |

*Primary Examiner*—Paul R. Michl
*Attorney, Agent, or Firm*—Louis F. Kline, Jr.

[57] ABSTRACT

Ion exchange resins having improved physical stability and perfect bead count are prepared by a free-radical catalyzed polymerization of a monomer mixture utilizing certain peroxyester and peroxydicarbonate catalysts, followed by functionalizing the so prepared polymer.

11 Claims, No Drawings

RESINS

This is a continuation of application Ser. No. 951,102, now abandoned, filed Oct. 13, 1978 which is in turn a continuation of Application Ser. No. 809,957 filed June 27, 1977 now abandoned.

This invention is directed to ion exchange resins of exceptional physical strength and form and method of preparing the same. More specifically, superior ion exchange resins are prepared by utilizing as polymerization catalysts a specific group of peroxyester and peroxydicarbonate catalysts in the polymerization of monomers to form ion exchange beads.

The techniques of preparing crosslinked vinyl copolymers in bead form (as precursors for conversion into ion exchange resins) by free-radical catalyzed polymerization of the monomer mixture in aqueous dispersion are well known. The term "crosslinked vinyl copolymer" and the like is used for the sake of brevity herein to signify copolymers of a major proportion, e.g., from 50 upwards to about 99.5 mole percent, preferably 80 to 99%, of a monovinyl monomer, for example, monovinyl aromatic monomers, e.g., styrene, vinyl toluene, vinyl naphthalene, ethyl vinyl benzene, vinyl chlorobenzene, chloromethyl styrene, and the like, and esters of acrylic and methacrylic acid, e.g., methyl acrylate, ethyl acrylate, propyl acrylate, isopropyl acrylate, butyl acrylate, tert-butyl acrylate, ethyl hexyl acrylate, cyclohexyl acrylate, isobornyl acrylate, benzyl acrylate, phenyl acrylate, alkyl phenyl acrylate, ethoxymethyl acrylate, ethoxypropyl acrylate, propoxypropyl acrylate, ethoxyphenyl acrylate, ethoxybenzyl acrylate, ethoxycyclohexyl acrylate, and the corresponding esters of methacrylic acid, with a minor proportion, e.g., of from about 0.5 up to 50 mole percent, preferably 1 to 20% of polyvinyl compounds having at least two active vinyl groups polymerizable with the aforesaid monovinyl monomer to form a crosslinked, insoluble, infusible copolymer, said polyvinyl compounds being, for example, divinyl benzene, trimethylolpropane trimethacrylate, ethylene glycol dimethacrylate, divinyl toluene, trivinyl benzene, divinyl chlorobenzene, diallyl phthalate, divinylpyridine, divinylnaphthalene, ethylene glycol diacrylate, neopentyl glycol dimethacrylate, diethylene glycol divinylether, bisphenol-A-dimethacrylate, pentaerythritol tetra- and trimethacrylates, divinylxylene, divinylethylbenzene, divinyl sulfone, divinyl ketone, divinyl sulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N'-methylenediacrylamide, N,N'-methylene dimethacrylamide, N,N'-ethylene-diacrylamide, trivinyl naphthalene, polyvinyl anthracenes and the polyallyl and polyvinyl ethers of glycol, glycerol, penterythritol, resorcinol and the monothio and dithio derivatives of glycols. The copolymer may also have incorporated therein polymerized units of up to about 5 mole % of other vinyl monomers which do not affect the basic nature of the resin matrix, for example methyl acrylate, acrylonitrile, butadiene and others known in the art.

The conventional conditions of polymerization used heretofore lead to crosslinked vinyl copolymers, which, when converted to ion exchange resins by attachment of functional groups thereto, have certain operational deficiencies resulting from physical weaknesses.

The practice of the present invention yields ion exchange resins in which the polymer beads have greater mechanical strength, improved perfect bead count, and increased resistance to swelling pressures which are produced within a bead during acid/base cycling (i.e., osmotic shock). The greater mechanical strength of the beads manifests itself in improved resistance to physical breakdown from external forces such as weight of the resin column bed, high fluid flows and backwashing. Thus, the physically stronger ion exchange resins embodied herein are especially useful in treating fluid streams of high flow rates, for example, condensate polishing applications in which resins of lesser quality are prone to mechanical breakdown and short life spans.

In copending U.S. patent application Ser. Nos. 766,120 and 797,716, filed Feb. 7, 1977 and May 17, 1977, respectively it has been proposed to improve ion exchange resin quality by means of controlling the oxygen content of the monomer mixture during polymerization and/or the addition of a "reaction modifier" to the monomer mixture. The teachings of these copending applications may be utilized in combination with the present invention and therefore should be considered as hereby incorporated herein by reference.

The present invention resides in the finding that a particular group of peroxy catalysts, not heretofore known to have advantages in the manufacture of ion exchange polymers, produce a polymer which, when functionalized, is substantially and unexpectedly superior to corresponding materials available heretofore. The catalysts which yield these advantages may be characterized generally as peroxyesters and peroxydicarbonates. The peroxyesters include the alkyl esters of peroxycarboxylic acids and the alkylene bis(esters) of peroxycarboxylic acids, which peroxyesters fall within the general formula:

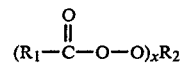

wherein $R_1$ is a branched alkyl of 3 to 12 carbon atoms and having a secondary or tertiary carbon linked to the carbonyl group;

x is a positive integer having a value of 1 or 2, and when x is 1, $R_2$ is a branched alkyl radical containing a tertiary carbon attached to the oxygen, that is:

wherein $R'$, $R''$ and $R'''$ are independently selected from linear or branched lower alkyl, and when x is 2, $R_2$ is an alkylene or aralkylene, in either case terminating in tertiary carbons attached to the oxygen, that is:

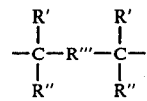

wherein $R'$ and $R''$ are as defined above and $R'''$ is a phenylene or lower alkylene.

The peroxyester catalysts are presently available commercially under the Lucidol Mark (Lucidol Division, Pennwalt Corporation) and are recommended for vinyl polymerizations.

The peroxydicarbonate catalysts useful by the present invention fall within the general formula

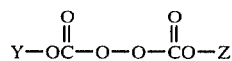

wherein Y and Z are independently selected from lower alkyl, cycloalkyl, alkyl-substituted cycloalkyl, and aralkyl. These materials are available commercially from Lucidol Division, Pennwalt Corporation under the name "Lupersol", and Noury Chemical Corporation under the name "Percadox".

A preferred group of peroxyester catalysts include t-butyl peroctoate, (t-butyl peroxy-2-ethyl-hexanoate), t-butyl peroxyisobutyrate, t-butyl peroxyneodecanoate, t-amyl peroctoate, and 2,5-dimethyl-2,5-bis(2-ethyl-hexanoylperoxy)-hexane.

A preferred group of peroxydicarbonate catalysts include, Di(4-t-butylcyclohexyl)peroxydicarbonate, Di(sec-butyl)peroxydicarbonate, Di(2-ethylhexyl)-peroxydicarbonate, Dicetyl peroxydicarbonate, and Dicyclohexyl peroxydicarbonate.

In accordance with this invention, the vinyl monomer, crosslinking monomer and any other optional monomer or monomers, are polymerized in an aqueous dispersion containing the peroxy catalyst (alternatively "free radical initiator") and additionally, if desired, oxygen and/or a "reaction modifier" as disclosed in the copending U.S. applications mentioned supra. Generally, from about 0.1% to about 2.0% of catalyst by weight of the monomer mixture is required to obtain the benefits of the invention, with the preferred amount being from 0.3% to 1.0% by weight of the monomer mixture. The methods of polymerization utilized by the invention does not generally depart from the well known methods available heretofore for manufacture of ion exchange polymers and resins.

The polymerization is normally carried out at temperatures ranging from about 30° C. to about 90° C., preferably 45° C. to 80° C. and even more preferably 50° C. to 75° C. In a preferred embodiment, it is desirable to employ lower temperatures of reaction in the initial stages of polymerization, that is until at least about 50%, preferably 75% or more, of the monomers in the dispersion are reacted. The above-stated temperatures are for the initial stages of polymerization; during final stages of polymerization the temperature is desirably raised 20° C.–30° C. above the temperature used for the initial stages. As taught in the copending U.S. patent applications mentioned supra, it is possible to operate at temperatures 15°–35° C. below temperatures normally used in prior art methods. When operating at lower temperatures, e.g., 30° C.–60° C. using catalysts of the invention (Percajox type) it may be desirable to employ a second so-called "chaser catalyst" which is active at higher temperatures, e.g., 75°–100° C., in order to achieve higher yields of crosslinked vinyl polymer, for example, from about 0.05 to 0.1% based on monomer weight of such initiators as benzoyl peroxide, t-butyl peroctoate, t-butyl peroxyisobutyrate, and the like.

The aqueous media in which the polymerization is conducted in dispersion form will contain minor amounts of the conventional suspension additives, that is, dispersants such as xanthan gum (biosynthetic polysaccaride), poly(diallyl dimethyl ammonium chloride), polyacrylic acid (and salts), polyacrylamide, magnesium silicate, and hydrolyzed poly(styrene-maleic anhydride); protective colloids such as carboxymethyl cellulose, hydroxyalkyl cellulose, methyl cellulose, polyvinyl alcohol, gelatin, and alginates; buffering aids such as phosphate and borate salts; and pH control chemicals such as sodium hydroxide and sodium carbonate.

The crosslinked, high-molecular weight copolymers are recovered from the reactor as hard, discrete beads of particle size within the range of about 0.02 to 2 mm, average particle size being on the order of 0.2 to 1 mm. These copolymers are converted to ion exchange resins by attachment of functional groups thereto by conventional means, such as functional groups including sulfonamide, trialkylamino, tetraalkyl ammonium, carboxyl, carboxylate, sulfonic, sulfonate, hydroxyalkyl ammonium, iminodiacetate, amine oxide, phosphonate, and others known in the art. Functionalizing reactions which may be performed on vinyl aromatic copolymers to produce ion exchange resins are exemplified by sulfonation with concentrated sulfuric acid, chlorosulfonation with chlorosulfonic acid followed by amination, reaction with sulfuryl chloride or thionyl chloride followed by amination, and chloromethylation followed by amination. Typical functionalizing reactions on (vinyl) acrylic copolymers include hydrolysis to acrylic acid resins, amidolysis, transesterification, and the like. Ion exchange resins may be further delineated by the types: strong acid cation, i.e., containing the groupings sulfonic ($-SO_3H$) or sulfonate ($-SO_3M$, where M is usually an alkali metal ion); weak acid cation, i.e., containing the groupings carboxyl ($CO_2H$) or carboxylate ($-CO_2M$, where M is usually an alkali metal ion); strong base anion, i.e., containing the tetraalkyl ammonium groupings: $-NR_3X$, where R is an alkyl or hydroxy alkyl group and X is usually chloride or hydroxide; and weak base anion, i.e., containing a trialkylamino group, $-NR_2$, where R is an alkyl or hydroxyalkyl group.

The improvements in the properties of the resins produced according to this invention are not evident until the crosslinked copolymers are converted to ion exchange resins by the attachment of the aforesaid functional groups. The enhanced physical strength of these latter resins is apparent from their resistance to crushing which is conveniently measured on the Chatillon instrument, as well as by visual inspection before and after use in ion exchange applications. For example, strong acid, styrene-type resins produced in accordance with the preferred method of this invention frequently exhibit Chatillon values in the range of about 1000 to about 5000 gm, force per bead, in contrast to resins derived from copolymers prepared by prior art polymerization methods which have Chatillon values in the range of about 50 to 500 gm/bead. Similarly, strong base styrene-type resins of the invention frequently exhibit Chatillon values of about 500 to 1500 in contrast to resins derived from copolymers prepared by prior art methods which have Chatillon values of 25 to 400.

The process of the invention is clarified by the following illustrative examples which are not to be construed as limitative thereof.

EXAMPLE 1

The polymerization reactor is two liter, three neck, round bottom flask equipped with a two blade paddle stirrer, thermometer, condenser, heating mantle with temperature controller and provision for sweeping with an inert gas. Into this reactor is charged a monomer mixture consisting of 500.4 g styrene and 85.6 g divinylbenzene, and 1.9 g t-butyl peroctoate. The head space is swept with nitrogen and the aqueous phase is then added: 510 g water, 20.1 g poly(diallyldimethyl ammonium chloride) dispersant, 1.6 g of gelatin protective colloid, 0.88 g boric acid, and sufficient 50% sodium hydroxide solution to maintain pH between 10.0 and 10.5. The stirrer is started and the reaction mixture is heated from room temperature to 75° C. over 45 minutes and held at this temperature for 4.0 hours. Thereafter, the polymerization is "finished off" by holding the reaction mixture at 95° C. for 1 hour. The copolymer beads are separated, washed and prepared for functionalization.

A strong acid resin may be prepared from the copolymer of Example 1 by means of the following alternative procedures.

Sulfonation A

A portion of the copolymer beads as prepared above (110 g) is added to 600 g of 95% $H_2SO_4$ is a one liter flask equipped with stirrer, condenser, dropping funnel, thermometer, caustic scrubber and heating means. Thirty nine grams of ethylene dichloride (bead swelling agent) are added, and the suspension is heated from 30° C. to 130° C. over a three hour period. This is followed by a hydration procedure in which water is added to quench the product. The sulfonated product is then washed to remove residual acid. The physical properties of the strong acid resin product are set forth in Table I, hereinafter.

Sulfonation B

A portion of the copolymer beads as prepared in Example I above (50 g) is added to 315 g of 94% $H_2SO_4$ in a one liter flask equipped with stirrer, condenser, dropping funnel, thermometer, caustic scrubber, and heating means. Thirty grams of ethylene dichloride (bead swelling agent) are added, and the suspension is heated to 60°–65° C. where it is held for one hour. The mixture is then heated to 115° C. and held there for 4 hours. This is followed by a hydration step in which water is added to quench the product. The sulfonated product is then washed to remove residual acid.

Of the first eighteen specific examples herein, Examples 1, 2, 4–7, and 11–18 the copolymer products were functionalized by Sulfonation method "A", and the remaining Examples employed Sulfonation method "B".

EXAMPLE 2

Using the same procedure set forth in Example 1, a copolymer ion exchange resin precursor was prepared from identical starting materials in identical amounts. The properties of the product, after sulfonation are as given below in Table I.

EXAMPLE 3

Following the procedure of Example 1, 254.5 g of styrene, 42.4 grams of divinylbenzene, 3.0 g methyl acrylate, and 1.5 g t-butyl peroctoate were charged to the reactor. The aqueous phase consisted of 270 g $H_2O$, 10.0 g poly(diallyl dimethyl ammonium chloride), 0.8 g of gelatin protective colloid, 0.45 g boric acid and 50% NaOH solution to maintain the pH between 10.0 and 10.5. The reaction mixture was heated to 75° C. for 2.7 hours, then 95° C. for an additional hour. The product was washed and sulfonated. The properties of the resin are given below in Table I.

EXAMPLE 4

Following the procedure of Example 1, 491.7 g of styrene, 85.5 g of divinylbenzene, 8.8 g methyl acrylate, 0.51 g methylcyclopentadiene dimer, and 1.90 g t-butylperoctoate were charged to the reactor. The aqueous phase consisted of 510.0 g $H_2O$, 20.1 g of poly(diallyl dimethyl ammonium chloride), 1.6 g of gelatin protective colloid, 0.83 g boric acid and 50% NaOH solution to maintain the pH between 10.0 and 10.5. The reaction mixture was heated to 75° C. for 4 hours and then 95° C. for an additional hour. The product was washed and sulfonated. The properties of the resin are given below in Table I.

EXAMPLE 5

Following the procedure of Example 1, 491.7 grams of styrene, 85.5 grams of divinylbenzene, 8.8 g of methyl acrylate, 0.59 g methylcyclopentadiene dimer, and 1.90 g of t-butylperoctoate were charged to the reactor. The aqueous phase consisted of 510.0 g of $H_2O$, 20.1 g poly(diallyl dimethyl ammonium chloride), 1.6 g gelatin protective colloid, 0.88 g boric acid and sufficient 50% NaOH solution to maintain the pH between 10.0 and 10.5. The reaction mixture was heated to 75° C. for 4 hours and 95° C. for an additional hour. The product was washed and sulfonated. The properties of the resin are given below in Table I.

EXAMPLE 6

Following the procedure of Example 5, using the same organic and aqueous phases, a resin was prepared having the properties set forth in Table I.

EXAMPLE 7

Following the procedure of Example 1, but including the reaction modifier α-methylstyrene dimer (0.59 g) and the initiator t-butyl peroctoate (1.9 g) a resin was prepared having the properties set forth in Table I.

EXAMPLE 8

Following the procedure of Example 1, but including 3.0 g methyl acrylate, 1.5 g t-butyl peroctoate, and 0.3 g cycloheptatriene (reaction modifier), a resin was prepared having the properties set forth in Table I.

EXAMPLE 9

Following the general procedure of Example 1, but including 3.0 g methyl acrylate, 1.5 g t-butyl peroctoate and 0.3 g norbornene (reaction modifier) a resin was prepared having the properties set forth in Table I.

EXAMPLE 10

Following the general procedure of Example 1, but including 3.0 g methyl acrylate, 1.5 g t-butyl peroctoate and 0.3 g dicyclopentadiene (reaction modifier) a resin was prepared having the properties set forth in Table I.

EXAMPLE 11

Following the general procedure of Example 1, but including 8.8 g methyl acrylate, 0.29 g methylcyclopentadiene dimer (reaction modifier) and 2.64 g di-(4-t-butylcyclohexyl)-peroxydicarbonate (Percodox 16-T.M.) a resin was prepared having the properties set forth in Table I. A blanket of 8% $O_2$ in $N_2$ was swept over the reaction mixture for 30 minutes. Also 0.59 sodium nitrite was used in the aqueous phase to prevent polymerization therein (also in Examples 12 and 13 which follow).

EXAMPLE 12

Following the general procedure of Example 1, but including 8.8 g methyl acrylate, 0.29 g methylcyclopentadiene dimer, and 2.64 g di-(4-t-butylcyclohexyl)-peroxydicarbonate (initiator) in the organic phase a resin was prepared. The initial polymerization was conducted at 57° C. for seven hours after which the temperature was raised to 95° C. for 1 hour. The properties of the resin were as shown in Table I.

EXAMPLE 13

Following the general procedure of Example 1, but using 8.8 methyl acrylate and 2.64 g di-(4-t-butylcyclohexyl)peroxydicarbonate (but no reaction modifier) and a reaction temperature of 56° C. for seven hours and 75° C. for two hours, a resin was prepared having the properties set forth in Table I.

EXAMPLE 14

Following the general procedure of Example 1, but using 1.9 g of 2,5-dimethyl-2,5-bis(2-ethylhexanoyl-peroxy)-hexane (initiator) and a reaction temperature of 70° C. for 4 hours followed by 90° C. for 1 hour, a resin was prepared having the properties set forth in Table I.

EXAMPLE 15

Following the general procedure of Example 1, but using 1.12 g t-butyl peroxyneodecanoate (initiator) an initial reaction temperature of 53°–54° C. for 4.5 hours and 70° C. for 1 hour thereafter, a resin was prepared having the properties set forth in Table I.

The following examples illustrate the prior art method of preparation and products resulting therefrom.

EXAMPLE 16

Following the general procedure of Example 1, using 2.20 grams of benzoyl peroxide (initiator) an initial reaction temperature of 75° C. for 4 hours and a final temperature of 95° C. for 1 hour, a resin was prepared having the properties set forth in Table I.

EXAMPLES 17 AND 18

Example 16 was repeated twice and the products resulting had properties set forth in Table I.

The resins produced according to the foregoing examples were tested to determine the percentage whole bead count (%WB) percentage perfect bead count (%PB) the crushing strength of the beads (Chatillon test method) and the % reduction of the perfect bead count after repeated cycling in acid and base solutions (on accelerated usage test). All tests were conducted on the resin after sulfonation.

TABLE I
PHYSICAL PROPERTIES OF RESINS

| Example No. | % WB | % PB | Chatillon g./bead | % Reduction in PB After Cycling |
|---|---|---|---|---|
| 1 | 98 | 98 | 1110 | 6 |
| 2 | 98 | 92 | 1100 | — |
| 3 | 99 | 95 | 1520 | 5* |
| 4 | 100 | 98 | 1610 | 6 |
| 5 | 99 | 97 | 1065 | 3 |
| 6 | 100 | 97 | 915 | 1 |
| 7 | 99 | 97 | 914 | 2 |
| 8 | 99 | 98 | 1810 | 3* |
| 9 | 99 | 95 | 1450 | 2* |
| 10 | 99 | 98 | 1900 | 8* |
| 11 | 97 | 98 | 1770 | — |
| 12 | 98 | 98 | 1400 | 0 |
| 13 | 98 | 84 | 1170 | — |
| 14 | 100 | 96 | 695 | — |
| 15 | 98 | 87 | 900 | — |
| 16 | 99 | 90 | 325 | 49 |
| 17 | 99 | 91 | 335 | 52 |
| 18 | 97 | 78 | 515 | 39 |

*50 cycles with 1N HCl and 1N NaOH, all others have 100 cycles with 1N HCL and 0.5N NaOH Weak and stron base resins having improved properties may also be prepared in accordance with the present invention, substituting the well known methods for postfunctionalizing the copolymer resin to produce weak or strong anion exchange groups for the sulfonation method shown above. A preferred method known in the art for functionalizing with anion exchange groups involves chloromethylation followed by amination.

EXAMPLES 19–20

Two styrene/divinylbenzene strong base resins were prepared following the general procedure of Example 1 for the copolymer, and using conventional chloromethylation/amination procedures to functionalize the copolymer. The copolymer of Example 19 utilized terpinolene as a reaction modifier and 2,6-dimethyl-2,4,6-octatriene was utilized for Example 20. Both copolymers utilized t-butyl peroctoate as the initiator. A control sample of a commercial strong base resin produced without reaction modifier and using a conventional prior art initiator was produced for comparative purposes. The properties of the resins produced are set forth in Table II.

TABLE II
PROPERTIES OF STRONG BASE RESINS

| Example No. | % WB | % PB | Chatillon g./bead |
|---|---|---|---|
| 19 | 100 | 98 | 610 |
| 20 | 100 | 99 | 750 |
| Control (commercial strong base resin) | 100 | 94 | 140 |

As used herein and in the appended claims the acid/base cycling test is conducted with 1 normal HCl and 0.5 normal NaOH at room temperature for 100 cycles, at approximately two cycles per hour.

What is claimed is:

1. In the process of preparing hard, crosslinked discrete ion exchange copolymer beads by the thermally induced free-radical polymerization in an aqueous dispersion of a monomer mixture comprised of a major proportion of a monovinyl aromatic monomer and a minor proportion of a crosslinking monomer having at least two active vinyl groups, the improvement which comprises conducting the polymerization reaction in the presence of a peroxy catalyst of the formula:

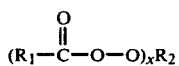

wherein $R_1$ is a branched alkyl of 3 to 12 carbon atoms and having a secondary or tertiary carbon linked to the carbonyl group and X is a positive integer having a value of either 1 or 2 and when X is 1, $R_2$ is a branched alkyl radical containing a tertiary carbon attached to the oxygen, and when X is 2, $R_2$ is an alkylene or aralkylene, in either case terminating in tertiary carbons attached to the oxygen, or of the formula:

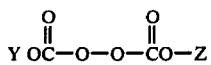

wherein Y and Z are independently selected from lower alkyl, cycloalkyl, alkyl-substituted cycloalkyl and aralkyl, and thereafter functionalizing the copolymer bead to form ion exchange sites therein.

2. The process of claim 1 wherein the peroxy catalyst is t-butyl peroctoate.

3. The process of claim 1 wherein the peroxy catalyst is t-butyl peroxyneodecanoate.

4. The process of claim 1 wherein the peroxy catalyst is 2,5-dimethyl-2,5-bis(2-ethylhexanoylperoxy)-hexane.

5. The process of claim 1 wherein the peroxy catalyst is di-(4-t-butylcyclohexyl)peroxydicarbonate.

6. The process of claim 1 wherein the peroxy catalyst is dicyclohexyl peroxydicarbonate.

7. The process of claim 1 wherein the polymerization with the peroxy catalyst is conducted with oxygen in contact with the monomer mixture so that oxygen is absorbed by said monomer mixture at least until the polymerization reaches the gel point.

8. The process of claim 1 wherein the polymerization with the peroxy catalyst is conducted with a modifier in admixture with the monomer mixture in a concentration of from about 0.01 to about 20 millimoles per mole of monomer, said modifier being an organic compound containing acetylenic or allylic unsaturation.

9. The process of claim 1 wherein the polymerization with the peroxy catalyst is conducted with the oxygen addition of claim 7 and the modifier addition of claim 8.

10. Hard, crosslinked discrete ion exchange beads having improved physical properties formed by the thermally induced free-radical polymerization in an aqueous dispersion of a monovinyl aromatic monomer and a polyvinyl monomer according to claim 1 followed by functionalization of the resulting copolymer to form ion exchange sites therein, which beads have a perfect bead count of at least 90%, a Chatillion value of at least 500 grams per bead and are capable of withstanding 50 cycles of alternating acid and base treatment without loss of more than 15% of the original perfect bead content.

11. Improved ion exchange beads derived from the ion exchange copolymer beads produced according to claim 1.

* * * * *

UNITED STATES PATENT AND TRADEMARK OFFICE
CERTIFICATE OF CORRECTION

PATENT NO. : 4,283,499

DATED : August 11, 1981

INVENTOR(S) : Thomas J. Howell

It is certified that error appears in the above—identified patent and that said Letters Patent is hereby corrected as shown below:

Col. 3, line 58, "Percajox" should be --Percadox--.

Col. 8, line 24, "stron" should be --strong--.

Signed and Sealed this

Twenty-fourth Day of January 1984

[SEAL]

Attest:

GERALD J. MOSSINGHOFF

Attesting Officer

Commissioner of Patents and Trademarks